350-276。 SR

XR 3,940,511

United States Patent [19]

Deal et al.

[11] 3,940,511

[45] Feb. 24, 1976

[54] METHOD FOR PREPARING HAZE-RESISTANT LITHIUM-SILICATE GLARE-REDUCING COATING

[75] Inventors: Samuel Broughton Deal, Lancaster; Donald Walter Bartch, Columbia, both of Pa.

[73] Assignee: RCA Corporation, New York, N.Y.

[22] Filed: June 25, 1973

[21] Appl. No.: 373,601

[52] U.S. Cl. .................. 427/165; 313/479; 427/64; 427/110; 427/168; 427/314; 427/353; 427/354; 427/380; 428/428

[51] Int. Cl.[2]. H01J 31/00; B05D 5/02; C03C 17/22

[58] Field of Search ............ 117/169 A, 63, 33.5 C, 117/33.3; 313/479; 427/353, 354, 380, 165, 168, 110, 64, 314

[56] References Cited

UNITED STATES PATENTS

| | | | |
|---|---|---|---|
| 1,164,710 | 12/1915 | Fenaroli | 117/63 |
| 1,581,732 | 4/1926 | Hageman | 117/169 A |
| 2,069,486 | 2/1937 | Tilden | 117/169 A |
| 2,440,969 | 5/1948 | Nightingall | 117/169 A |
| 2,576,845 | 11/1951 | McDonald | 117/169 A |
| 3,326,715 | 6/1967 | Twells | 117/124 A |
| 3,526,530 | 9/1970 | Sams | 117/169 A |
| 3,625,737 | 12/1971 | Ricchezza | 117/62 |
| 3,635,751 | 1/1972 | Long | 117/169 A |
| 3,898,509 | 8/1975 | Brown et al. | 313/478 |

FOREIGN PATENTS OR APPLICATIONS

| | | |
|---|---|---|
| 1,592,431 | 6/1970 | France |

*Primary Examiner*—Ronald H. Smith
*Assistant Examiner*—William H. Schmidt
*Attorney, Agent, or Firm*—G. H. Bruestle; L. Greenspan

[57] ABSTRACT

A glare-reducing coating, as for a viewing surface of a cathode-ray tube, is prepared by (a) warming the surface of a support to about 30° to 100°C, (b) coating the warm surface with an aqueous solution containing a lithium stabilized silica sol, (c) drying the coating, (d) baking the dry coating at about 150° to 450°C, and then (e) subsequent to said heating step (d), washing the dry coating with hot water. The coating may contain carbon particles or carbon particles and a color-correcting dye.

6 Claims, 1 Drawing Figure

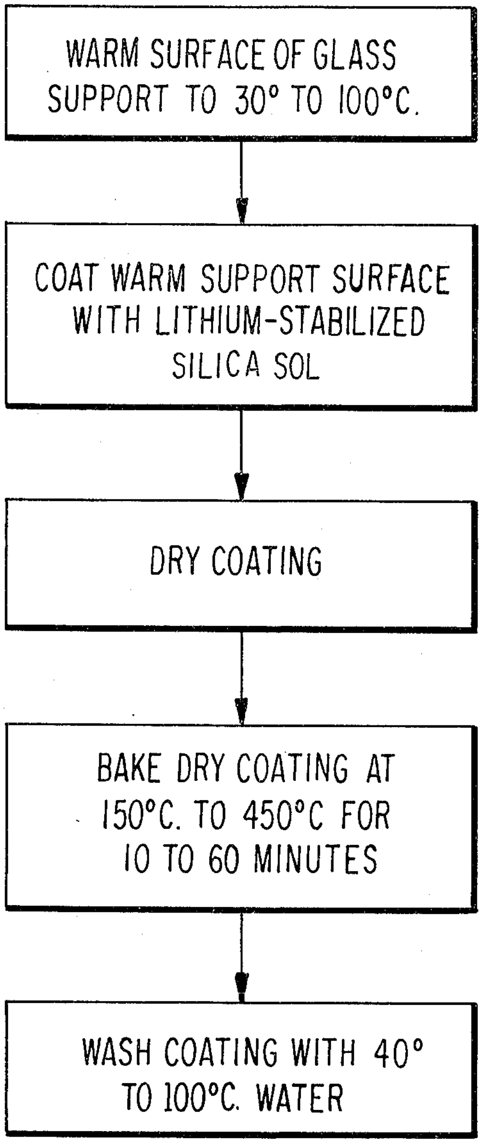
WARM SURFACE OF GLASS SUPPORT TO 30° TO 100°C.
COAT WARM SUPPORT SURFACE WITH LITHIUM-STABILIZED SILICA SOL
DRY COATING
BAKE DRY COATING AT 150°C. TO 450°C FOR 10 TO 60 MINUTES
WASH COATING WITH 40° TO 100°C. WATER

METHOD FOR PREPARING HAZE-RESISTANT LITHIUM-SILICATE GLARE-REDUCING COATING

BACKGROUND OF THE INVENTION

This invention relates to an improved method for producing a glare-reducing lithium-silicate coating on a surface.

In U.S. Pat. No. 3,635,751 to G. E. Long et al., there is described a glare-reducing coating for a glass surface, said coating having a rough surface and composed of a lithium-silicate material. That coating may be prepared by applying to a warm (30° to 100°C) glass surface a coating of an aqueous solution containing a lithium-stabilized silica sol, drying the coating, and then baking the dry coating to about 150° to 450°C. Submicron-sized carbon particles may be included in the coating to provide a light-attenuating characteristic to the coating.

It has been observed that glare-reducing lithium-silicate coatings on cathode-ray-tube faceplates develop objectionable haze or "bloom" upon standing or storage, as in a warehouse, at normal ambient humidities and temperatures. The haze is objectionable esthetically and also it reduces the brightness and color fidelity of the transmitted image. A similar haze is observed for sodium and potassium silicate coatings that have been baked at temperatures of about 400° to 500°C.

It has also been observed that some glare-reducing lithium-silicate coatings which contain also light-attenuating particles therein transmit an image which appears to have a brownish or other tint. Such tint reduces the color fidelity of the video image and is frequently distracting to the viewer.

SUMMARY OF THE INVENTION

The novel method follows the prior method of applying to a warm glass surface a coating of an aqueous solution containing a lithium stabilized silica sol, drying the coating and then baking the dry coating at about 150° to 450°C. Then, according to the novel method, subsequent to the baking step, the dry baked coating is washed or rinsed with hot water.

Washing the coating with hot water reduces or eliminates the tendency of the coating to form a haze or bloom. The washing treatment may be carried out either before or after the haze has formed. In the latter case, the washing also removes any haze that has formed. The washing is believed to remove soluble lithium compounds which may be present in the coating. Soluble lithium compounds in the coating are believed to react with atmospheric gases, such as carbon dioxide, to produce the haze.

To correct for any tint in the transmitted image which may be imparted by the glare-reducing coating, the coating may include a small amount of a color-correcting dye. The dye may be present in such proportions as to produce a neutral gray transmission of light to the human eye, or it may impart a desired tint to the coating.

BRIEF DESCRIPTION OF THE DRAWING

The sole FIGURE is a flow chart diagram of the novel method.

DESCRIPTION OF THE PREFERRED EMBODIMENTS

The novel method may be carried out as described in the above-cited patent to G. E. Long et al. except that, in addition, the dry baked coating is washed with hot water. The term "hot" is relative, but is used herein to mean temperatures in the range of about 40°C up to the boiling point of water. Since, as a practical matter, boiling water cannot be used without a loss of heat, the range of about 40° to 95°C is given. The complete method is schematically illustrated in the sole FIGURE which shows the same flow sheet diagram as is shown in FIG. 3 of the above-cited patent to G. E. Long et al except that the additional step of washing with hot water is added as the last step in the method.

In each of the specific examples herein, a glass surface which is to carry the glare-reducing coating is carefully cleaned. The surface may be the outer surface of the faceplate panel of a cathode-ray tube, or the convex surface of a glass safety panel to be laminated to a cathode-ray tube, or may be the surface of any other glass panel which is to be a viewing surface, such as the glass for a framed picture. The surface may be cleaned by any of the known scouring and washing methods used to remove dirt, lint, oil, scum, etc. It is preferred to scrub the surface with a commercial scouring compound, then rinsing with deionized water, then swabbing with a 2 percent ammonium bifluoride solution, then again rinsing with deionized water, and then draining and air drying.

The surface is then heated to about 30° to 100°C in an oven. Temperatures between about 50° and 70°C are preferred. The surface is coated with a dilute aqueous solution containing a lithium-stabilized silica sol. The solution may contain optionally submicron-sized particles of carbon or other light-attenuating material. Carbon particles may be introduced as a suspension of carbon particles in water such as India ink, Aquadag (marketed by Acheson Colloids Company, Port Huron, Mich.), or CARBOLAC (marketed by Cabot Corporation, Boston, Mass.) for example The aqueous solution may also include a tinting dye to compensate for any undesirable tint in the coating or to impart a desired tint to the coating. The dye should be uniformly dispersed in the coating and should not be leached by the subsequent washing step. It has been found that Anthraquinone Blue 3G and Pontamine Black E (both marketed by E. I. du Pont de Nemours) used in quantities of less than 0.01 weight percent of the dry coating may be used for a brown tint which may result from the use of India ink in the coating. Phenamine Black E-200 (marketed by GAF Corporation, New York, New York) may also be used for this purpose. Combinations of dyes may also be used.

The clean warm surface is coated with a dilute aqueous solution comprised of a lithium-stabilized silica sol. The preferred material is a lithium-stabilized silica sol having an $SiO_2$:$Li_2O$ ratio of about 4:1 to 25:1. Some examples of suitable formulations are given at the end of this specification. The coating may be applied in one or several layers by any conventional process, such as by air spraying or airless spraying. It is preferred to employ a spray process which applies many spray passes over the warm surface. It is also preferred to turn the surface many times during the spray application process to obtain uniformity by changing the direction of the spray passes. It is also preferred to use an ionized-air spray as a method of coating application in order to obtain improved uniformity of the final coating. The uniformity of the ionized-air-spray-applied coating is better than with conventional air-spray-applied coating. The time required for applying a coating by ionized-air-spray is approximately one half that required for air-spray-applied coating.

The temperature of the surface, the specific technique for applying the coating and the number of layers applied are chosen empirically to produce a coating with the desired thickness. It has been found that, when applying the coating by spraying, the coating thickness should be such as to permit the operator to resolve the three bulbs of the reflection of a three-bulb fluorescent-light fixture located about 6 feet above the glass support. A thicker initial coating results in a thicker final coating. Generally, the thicker the coating, the greater the reduction in glare and the greater the loss in resolution of the transmitted image. Conversely, the thinner the coating, the lesser the reduction in glare and the lesser the loss in resolution of the transmitted image.

Also, when applied by spraying, the coating takes on an appearance of dryness. Greater dryness is achieved (1) by using higher panel temperature while applying the coating, (2) by using more air in the spray when spraying with compressed air, (3) by using a greater spraying distance when spraying on the coating, and (4) by increasing the mol ratio of $SiO_2/Li_2O$ in the lithium-stabilized silica sol that is used. But, when this is overdone, the coating crazes. The greater the appearance of dryness, the greater the glare reduction and the greater the loss in resolution of the transmitted image. Conversely, the lesser the appearance of dryness, the lesser the glare reduction and the lesser the loss in resolution in the transmitted image.

After coating the warm glass support, the coating is dried in air with care to avoid the deposition of lint or other foreign particles on the coating. Finally, the dry coating is heated at about 150° to 450°C for about 10 to 60 minutes. The optimum conditions of time and temperature are determined empirically. Generally, the higher the heating temperature, the lower will be the glare reduction in the product and the higher will be the abrasion resistance. The coating may be recycled through the heating step. Recycling at a particular temperature has the effect of reaching a stable point. Where India ink and/or dye is included in the formulation, the baking temperatures should be in the range of 150° to 300°C.

After the baking is completed, the dry coating is washed with hot water which may be about 40° to 95°C. It is preferred to use the hottest water available for this purpose. The water washing may be conducted by dipping, or by flushing the water over the surface, but preferably is applied by a pressure spray. Acid reagents, such as 5 percent acetic acid, may be included in the wash water. The use of either a pressure spray with hotter water or a pressure spray with acetic acid completely eliminates the tendency to form a haze on the coating.

The mechanism of haze formation with an alkaline-based coating of this type is believed to be the reaction of carbon dioxide or other gases from the atmosphere in the presence of moisture with free alkali in the coating to produce alkali carbonates or other alkali salts. Theoretically, lithium carbonate may be formed by the reaction of carbon dioxide with lithium hydroxide in the coating. Removal of lithium hydroxide from the coating by washing prevents the problem of haze formation from occurring. Removal of lithium carbonate from the coating by washing also removes any haze that has formed.

Sodium and potassium silicate coatings may be washed by the method of the invention to remove or prevent the formation of haze formed by weathering. A baking after washing is required for both sodium and potassium silicate coatings in order to maintain adequate abrasion resistance. A baking after washing is not required for lithium silcate coatings.

A fast test for determining the effectiveness of the water-washing treatment to prevent haze formation has been developed. This test consists of a simple pH measurement using pH paper. After washing with hot water, the pH paper is applied directly to the coated surface. The complete removal of alkali from the coating is indicated when a neutral pH is reached.

Table 1 sets forth eight different formulations in parts by weight which may be used in practicing the invention. Table 2 sets forth eight different examples each using the indicated formulation of Table 1. The spraying technique is an air spray. Airless spray or ionized-air-spray may be substituted.

Table 1

| | Formulations | | | | | | | |
|---|---|---|---|---|---|---|---|---|
| | A | B | C | D | E | F | G | H |
| Water, Distilled or Deionized | 190 | 170 | 136 | 136 | 78 | 78 | 82.3 | 83.9 |
| Lithium Polysilicate 48 Solution 20 wt. % | 10 | 30 | 24 | 24 | 20 | 20 | 13.0 | 13.0 |
| India Ink (Higgins) 4 wt. % Carbon | 0 | 0 | 6.5 | 3.8 | 0 | 0 | 4.5 | 3.0 |
| Aquadag E (Acheson) 22 wt. % Carbon | 0 | 0 | 0 | 0 | 0.9 | 0.45 | 0 | 0 |
| Polyvinyl Pyrrolodone | 0 | 0 | 0 | 0 | 0.1 | 0.1 | 0 | 0 |
| Ammonium Hydroxide Concentrated | 0 | 0 | 0 | 0 | 1.0 | 1.0 | 0 | 0 |
| Anthraquinone Blue G3 (du Pont) | 0 | 0 | 0 | 0 | 0 | 0 | 0.2 | 0.12 |

Table 2

| | Examples 1 | 2 | 3 | 4 | 5 | 6 | 7 | 8 |
|---|---|---|---|---|---|---|---|---|
| Formulation | A | B | C | D | E | F | G | H |
| Spraying Technique | Air | Air | Air | Air | Air | Air | Air | Air |
| Glass Surface Temp. °C | 80 | 50 | 45 | 45 | 50 | 50 | 50 | 50 |
| Baking Temp. °C | 400 | 450 | 200 | 300 | 425 | 425 | 150 | 150 |
| Baking Time Minutes | 12 | 60 | 30 | 60 | 30 | 30 | 30 | 30 |
| Washing Technique | Pressure Spray | Pressure Spray | Flush | Flush | Pressure Spray | Pressure Spray | Pressure Spray | Pressure Spray |
| Washing Water Temp. °C | 50 | 60 | 85 | 70 | 75 | 75 | 75 | 75 |
| Washing Time Minutes | 10 | 10 | 10 | 10 | 1 | 1 | 1 | 1 |
| Transmission of Coating % | 100 | 100 | 61 | 77 | 60 | 80 | 63 | 80 |

We claim:

1. A method for preparing an optical viewing screen having glare-reducing viewing surface consisting essentially of the steps of
   a. warming the surface of a glass support to about 30° to 100°C,
   b. coating said surface with an aqueous solution containing a lithium-stabilized silica sol,
   c. drying said coating,
   d. baking said dry coating to about 150° to 450°C,
   e. and then, subsequent to said baking step (d), washing said dry coating with water having a temperature above about 40°C.

2. The method defined in claim 1 wherein said washing water is applied to said coating for about 0.5 to 20 minutes.

3. The method defined in claim 1 wherein said dry coating includes 1 to 10 weight percent of carbon particles, said particles having an average particle size of less than 100 millimicrons and said baking of step (d) is conducted at about 150° to 300°C.

4. The method defined in claim 3 wherein said dry coating includes also a color-correcting dye in proportions sufficient to produce a neutral gray transmission of light to the human eye.

5. The method defined in claim 1 wherein, in step (a), said surface is warmed to about 50° to 70°C.

6. The method defined in claim 1 wherein said solution contains 1 to 10 weight percent of a lithium-stabilized silica sol, said sol having an $SiO_2$:$Li_2O$ ratio of about 4:1 to 25:1.

* * * * *